US008484316B2

(12) United States Patent
Robinson et al.

(10) Patent No.: US 8,484,316 B2
(45) Date of Patent: *Jul. 9, 2013

(54) METHODS AND APPARATUS FOR PROVIDING ACCESS TO CONTENT

(75) Inventors: Michael Robinson, Foster City, CA (US); Josef Coetsee, San Jose, CA (US)

(73) Assignee: Electronics For Imaging, Inc., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,506

(22) Filed: Mar. 26, 2012

(65) Prior Publication Data
US 2012/0182570 A1 Jul. 19, 2012

Related U.S. Application Data

(63) Continuation of application No. 10/928,966, filed on Aug. 27, 2004, now Pat. No. 8,171,103.

(51) Int. Cl.
*G06F 15/16* (2006.01)
*G06F 15/173* (2006.01)

(52) U.S. Cl.
USPC .................. 709/217; 709/223; 709/227

(58) Field of Classification Search
USPC .......................................... 709/217, 223, 227
See application file for complete search history.

(56) References Cited

U.S. PATENT DOCUMENTS

| 5,267,171 | A | 11/1993 | Suzuki et al. |
|---|---|---|---|
| 5,809,415 | A | 9/1998 | Rossmann |
| 6,348,972 | B1 | 2/2002 | Taniguchi et al. |
| 6,400,810 | B1 | 6/2002 | Skladman et al. |
| 6,421,708 | B2 | 7/2002 | Bettis |
| 6,535,586 | B1 | 3/2003 | Cloutier et al. |
| 6,965,917 | B1 | 11/2005 | Aloni et al. |
| 7,127,515 | B2 | 10/2006 | Patterson |
| 7,243,127 | B2 | 7/2007 | Tabayoyon et al. |
| 7,509,379 | B2 | 3/2009 | Degraeve |
| 2002/0012329 | A1 | 1/2002 | Atkinson et al. |
| 2002/0042838 | A1 | 4/2002 | Tabayoyon et al. |
| 2002/0083182 | A1 | 6/2002 | Alvarado et al. |
| 2002/0184305 | A1 | 12/2002 | Simpson et al. |
| 2003/0028811 | A1 | 2/2003 | Walker et al. |
| 2004/0054893 | A1 | 3/2004 | Ellis |
| 2004/0139318 | A1 | 7/2004 | Fiala et al. |
| 2004/0172451 | A1 | 9/2004 | Biggs et al. |
| 2005/0216639 | A1 | 9/2005 | Sparer et al. |
| 2006/0161639 | A1 | 7/2006 | Kato |

FOREIGN PATENT DOCUMENTS

| EP | 1274017 | 1/2003 |
|---|---|---|
| GB | 2379040 | 2/2003 |

*Primary Examiner* — Aaron Strange
(74) *Attorney, Agent, or Firm* — Michael A. Glenn; Glenn Patent Group

(57) ABSTRACT

Methods and apparatus are provided for providing access to content via messaging services, such as email, voicemail, instant messaging, text messaging, or other similar messaging services. A content server is provided that includes a user interface, a web server and a file. The web server includes a web page for accessing the file. A user provides user information associated with a messaging address via the user interface, and the content server then sends a message including the web address of the web page to the messaging address. The user may then retrieve the message at a client computer, and may then download the file to the client computer by entering the web address into a web browser on the client computer.

10 Claims, 7 Drawing Sheets

| User ID | User Address | Address Type |
|---|---|---|
| Marsha | Marshab@xyz.com | email |
| Jan Brady | 415-357-2222 | voicemail |
| Cindy | cindy@aol.com | instant message |
| 999-67-2376 | 212-674-3891 | text messaging |
| 4299-5235-6755-0008 | 415-357-2222 | voicemail |
| 5diGT20N | greg@comcast.net | email |

| User ID | Password | User Address | Address Type |
|---|---|---|---|
| Marsha | blackcat | Marshab@xyz.com | email |
| Jan Brady | alice579 | 415-357-2222 | voicemail |
| Cindy | b1r2a3c4e5s | cindy@aol.com | instant message |
| 999-67-2376 | vkq8 | 212-674-3891 | text messaging |
| 4299-5235-6755-0008 | jn5x0P | 415-357-2222 | voicemail |
| 5diGT20N | Wombat3 | greg@comcast.net | email |

FIG. 4B

| User ID | File Access Code | User Address | Address Type |
|---|---|---|---|
| Marsha | All | Marshab@xyz.com | email |
| Jan Brady | Data | 415-357-2222 | voicemail |
| Cindy | Music Apps | cindy@aol.com | instant message |
| 999-67-2376 | None | 212-674-3891 | text messaging |
| 4299-5235-6755-0008 | Data | 415-357-2222 | voicemail |
| 5diGT20N | Image Data; Image Apps | greg@comcast.net | email |

METHODS AND APPARATUS FOR PROVIDING ACCESS TO CONTENT

CROSS REFERENCE TO RELATED APPLICATIONS

This application is a continuation of U.S. patent application Ser. No. 10/928,966, filed Aug. 27, 2004 now U.S. Pat. No. 8,171,103, which is currently allowed, which application is incorporated herein in its entirety by this reference thereto.

BACKGROUND

This invention relates to apparatus and methods for providing access to content. In particular, this invention relates to apparatus and methods for providing access to content via messaging services, such as email, voicemail, instant messaging, text messaging, or other similar messaging services.

In recent years, communications and computer equipment such as computers, personal digital assistants, cellular telephones, facsimile machines, copiers and printers (collectively referred to herein as computer devices) have become increasingly affordable and abundant. As computer devices have become more prevalent, technologies for connecting computer devices to one another have also become more pervasive. For example, it is common today for home and office computers to be connected together in networks with other computers, printers, data storage devices, Internet web servers, and other computer devices.

The trend toward increasingly interconnected networks of computer devices is expected to increase in size and scope. For example, more businesses and households are implementing wired and wireless computer networks for connecting computer devices. The increasing scope of computer networking technology offers numerous advantages to users. For example, users may easily communicate with one another and share computer resources, such as Internet access, data storage devices and printers. Indeed, one significant advantage of a computer network is that networked computer devices may easily exchange data files and computer applications.

Referring now to FIG. 1, a previously known networked computer system is described. In particular, exemplary networked computer system 10 includes client device 12 coupled via network 14 to server 16. Client device 12 may be a desktop computer or other similar computer device, network 14 may be a local area network, wide area network, the Internet, or other similar network, and server 16 may be computer server, such as a print server or other similar computer server, coupled to printer 18.

Server 16 may include web server 24 and computer memory 26, which may be used to store data files 28 and application programs 30. Data files 28 may include, for example, print jobs or other similar files. Application programs 30 may include, for example, printer drivers for printer 18, image processing tools, print job management programs, workflow processing programs, or other similar programs. Web server 24 may host web pages 32 that may be used by client device 12 to download data files 28 and application programs 30 from server 16. For example, web server 24 may host a first web page 32a that provides access to data files 28, and second web page 32b that provides access to application programs 30. Thus, using web browser 20 on client device 12, a user may download data files 28 and applications 30 for storage in memory 22.

To accomplish this task, the user of client device 12 must provide web browser 20 with the web address (e.g., the uniform resource locator ("URL")) for web pages 32a and 32b.

If the user knows the URL information in advance, then the process of browsing web pages 32a and 32b and downloading the desired files and applications is quite simple. If the user does not know the URL information, however, the process of obtaining copies of data files 28 and applications 30 may be more complicated and time-consuming. For example, the user may attempt to identify the URL information by browsing the network, contacting a system administrator, searching through system help files, or asking a colleague. None of these techniques, however, may be expedient, and the user may waste a considerable amount of time attempting to locate the desired web addresses.

Further, one or more of applications 30 may require additional identifying information regarding computer devices coupled to network 14. For example, an application 30a may be a print job management program used to monitor and control print jobs that have been submitted to server 16. If the user wants to use application 30a to monitor print jobs submitted to server 16 for printing on printer 18, the user may be required to provide the network addresses (e.g., the Internet protocol ("IP") addresses) of server 16 and printer 18 during the process of installing application 30a on computer device 12. If the user knows the IP addresses of server 16 and printer 18 in advance, then the process of installing application 30a is quite easy. If the user does not know the IP addresses, however, the installation process may be more complicated and time-consuming.

In view of the foregoing, it would be desirable to provide methods and apparatus that allow a user of a client device to download content from a network server without requiring that the user know network address information of hardware and/or software devices that provide access to the content.

It additionally would be desirable to provide methods and apparatus that allow a user of a client device to install application programs that have been downloaded from a network server for use with computer devices coupled to a computer network, without requiring that the user know address information of the computer devices.

SUMMARY

In view of the foregoing, it is an object of this invention to provide methods and apparatus that allow a user of a client device to download content from a network server without requiring that the user know network address information of hardware and/or software devices that provide access to the content.

It additionally is an object of this invention to provide methods and apparatus that allow a user of a client device to install application programs that have been downloaded from a network server for use with computer devices coupled to a computer network, without requiring that the user know address information of the computer devices.

These and other objects of this invention are accomplished by providing methods and apparatus that provide access to content via messaging services, such as email, voicemail, instant messaging, text messaging, or other similar messaging services. In particular, a content server is provided that includes a user interface, a web server and a file. The web server includes a web page for accessing the file. A user may provide user information associated with a messaging address via the user interface, and the content server then sends a message including the web address of the web page to the messaging address. The user may then retrieve the message at a client computer, and may then download the file to the client computer by entering the web address into a web browser on the client computer.

BRIEF DESCRIPTION OF THE DRAWINGS

The above-mentioned objects and features of the present invention can be more clearly understood from the following detailed description considered in conjunction with the following drawings, in which the same reference numerals denote the same elements throughout, and in which:

FIGS. 4A-4C are diagrams of exemplary user registries in accordance with this invention.

DETAILED DESCRIPTION

Figure 1:
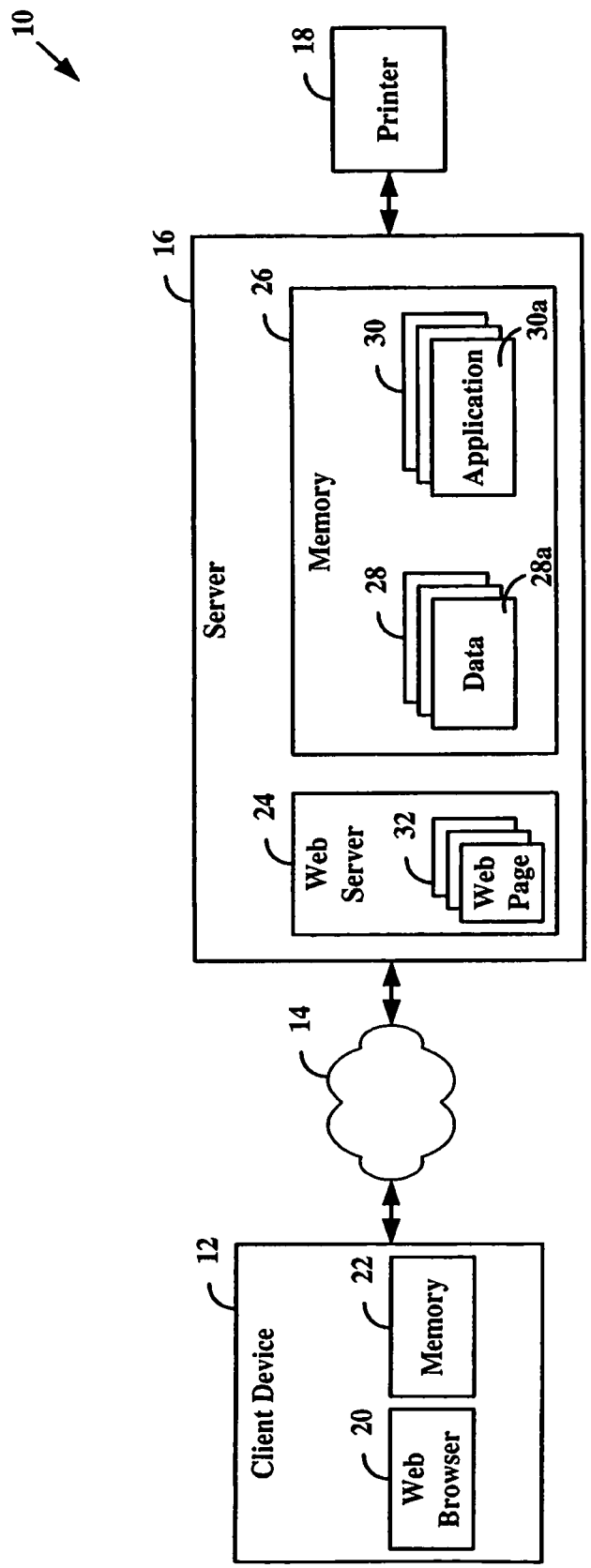
FIG. 1 is a block diagram of a previously known networked computer system.
Figure 2:
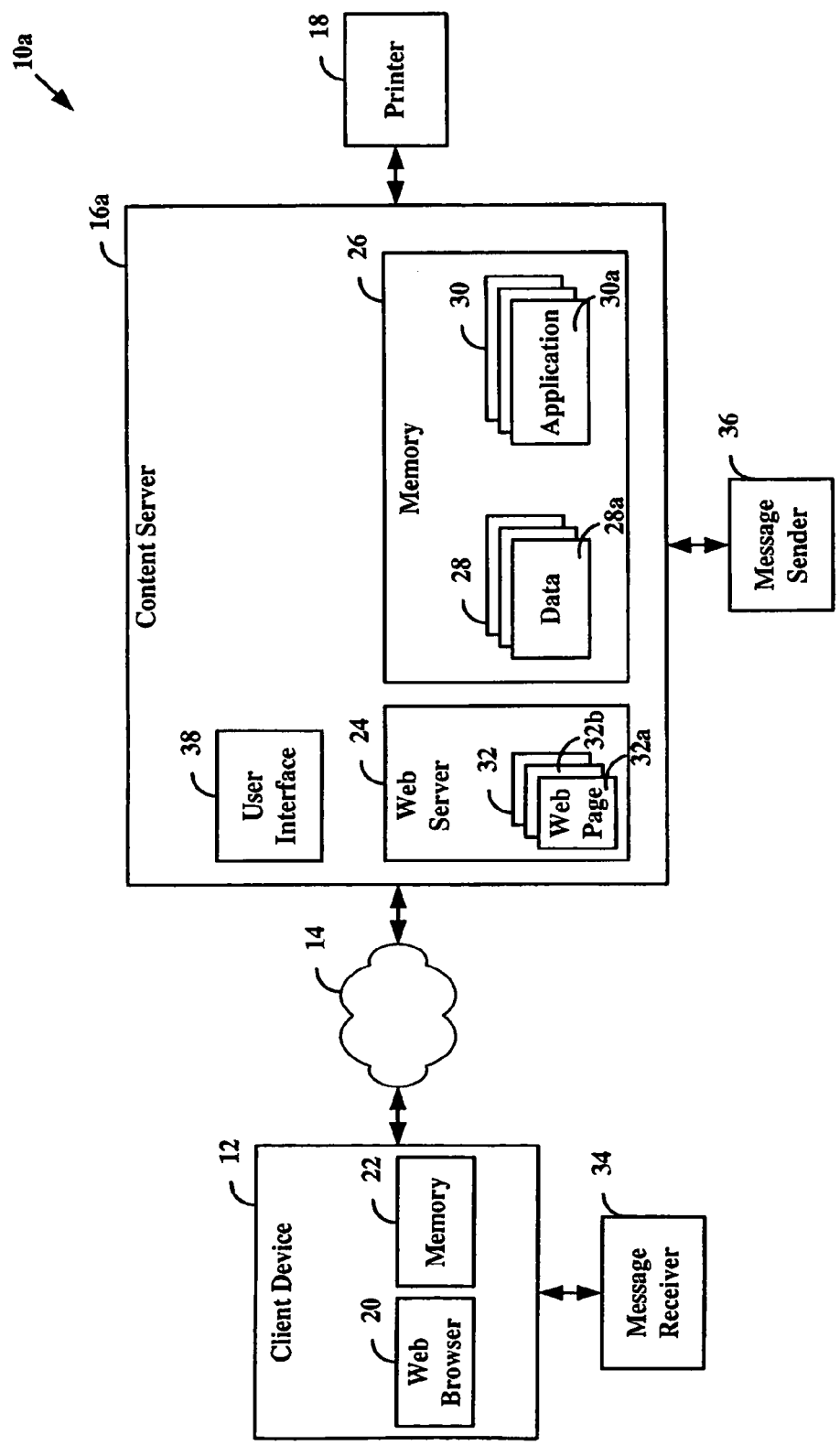
FIG. 2 is a block diagram of an exemplary networked computer system in accordance with this invention.

Referring now to FIG. 2, an exemplary networked computer system in accordance with this invention is described. Networked computer system 10a includes client device 12 coupled via network 14 to content server 16a. Client device 12 may be a computer workstation, desktop computer, laptop computer, handheld computer, personal digital assistant, wireless telephone, or similar client device. Network 14 may be wired network, wireless network, local area network, wide area network, the Internet, or combination of such networks. Content server 16a may be a computer server, computer workstation, desktop computer, laptop computer, print server (e.g., a Fiery®, EDOX® or Splash® print server by Electronics for Imaging, Inc., Foster City, Calif., U.S.A.), scan server, or similar device. Content server 16a may include data files 28, such as print jobs, text files, word processing documents, digital image files, digital audio files, electronic books, or other similar data files. Content server 16a also may include application programs 30, such as printer drivers, image processing tools, print job management programs, workflow processing programs, computer software applications, computer game applications, cellular telephone applications, or other similar application programs.

Client device 12 and content server 16a may be located together, or may be located separately. For example, client device 12 and content server 16a may be located together in a corporate office. Alternatively, client device 12 may be located in an office in a first city (e.g., Los Angeles), and content server 16a may be located in a shopping complex in a second city (e.g., New York). Client device 12 and content server 16a may be owned by the same person or entity, or may be owned by two different entities. For example, client device 12 and content server 16a may be part of a single corporate computer network. Alternatively, client device 12 may be owned by an individual, and content server 16a may be owned by a coffee shop.

Client device 12 is coupled to message receiver 34, which may be a computer workstation, desktop computer, laptop computer, handheld computer, personal digital assistant, telephone, or similar message receiver. Message receiver 34 may include an email application, voicemail message application, instant message application, text message application or other similar application that may be used to receive messages at one or more messaging addresses associated with a user of client device 12. For example, if message receiver 34 includes an email application, an associated messaging address may be the user's email address. Similarly, if message receiver 34 includes a text messaging application, an associated messaging address may be the user's text messaging address. Client device 12 and message receiver 34 may be included in separate devices or may be included in the same device. For example, client device 12 may be a computer and message receiver 34 may be a standalone device, such as a telephone coupled to a voice messaging system. Alternatively, client device 12 may be a computer that includes an email application 34 for receiving email messages.

Content server 16a is coupled to message sender 36, which may be a computer workstation, desktop computer, laptop computer, handheld computer, personal digital assistant, telephone, or similar message sender. Message sender 36 may include an email application, voice messaging application, instant message application, text message application or other similar message sending application. Content server 16a and message sender 36 may be included in separate devices or may be included in the same device. For example, content server 16a may be a print server and message sender 36 may be a standalone device, such as a voicemail system capable of creating and sending voice messages. Alternatively, content server 16a may be a web server that includes an instant messaging application 36 capable of creating and sending instant messages.

Content server 16a also includes user interface 38, which may include a touch screen, keyboard, monitor, mouse, display, speaker, microphone, card reader, voice recorder, biometric input device, or other similar user interface. To download data files 28 and/or application programs 30 from content server 16a, a user of client device 12 specifies one of the user's associated messaging addresses via user interface 38. For example, if user interface 38 includes a monitor and keyboard, the monitor may display a prompt asking the user to specify a messaging address for receiving information about downloading the desired data files 28 and/or application programs 30.

In reply, the user may enter an email address via the keyboard. After the user provides the address, content server 16a provides a list of data files 28 and application programs 30 that may be downloaded. For example, content server 16a may display on a monitor a list of icons associated with each of data files 28 and application programs 30 that may be downloaded by the user. The user may then select one or more desired data files 28 and/or application programs 30. For example, if user interface 38 includes a mouse, the user may click the icons associated with the desired data files 28 and/or application programs 30.

In response, content server 16a causes message sender 38 to send a message to the user's specified messaging address. The message includes an address such as the web addresses of the web pages 32 that may be used to access the data files 28 and/or application programs 30 selected by the user. For example, if the user specified an email address and selected a data file 28a that may be accessed via web page 32a, content server 16a causes message sender 36 to send an email message including the web address of web page 32a to the user's email address. Alternatively, if the user provided a telephone number and selected an application program 30a that may be accessed via web page 32b, content server 16a causes message sender 36 to send a voice message including the web address of web page 32b the user's specified telephone number. Persons of ordinary skill in the art will understand that content server 16a and message sender 36 may be used to send web address information via other message types (e.g., instant messages, text messages, or other similar messages).

The user may then retrieve the web address of web pages 32 from message receiver 34. For example, if the user specified an email address to content server 16*a*, the user may retrieve the web addresses of web pages 32 from the received email message. Similarly, if the user specified a telephone number to content server 16*a*, the user may retrieve the web addresses of web pages 32 from the received voicemail message. The user may then provide the retrieved web addresses to web browser 20 to view web pages 32, and then download the selected data files 28 and/or application programs 30 from content server 16*a*.

Persons of ordinary skill in the art will understand that each of web pages 32 may be used to access one or more of data files 28 and/or application programs 30. For example, web page 32*a* may be used to access data file 28*a*, web page 32*b* may be used to access data file 28*b* and application program 30*b*, web page 32*c* may be used to access all data files 28, web page 32*d* may be used to access all application programs 30, web page 32*e* may be used to access all data files 28 that are image data files, and so on.

Figure 3:
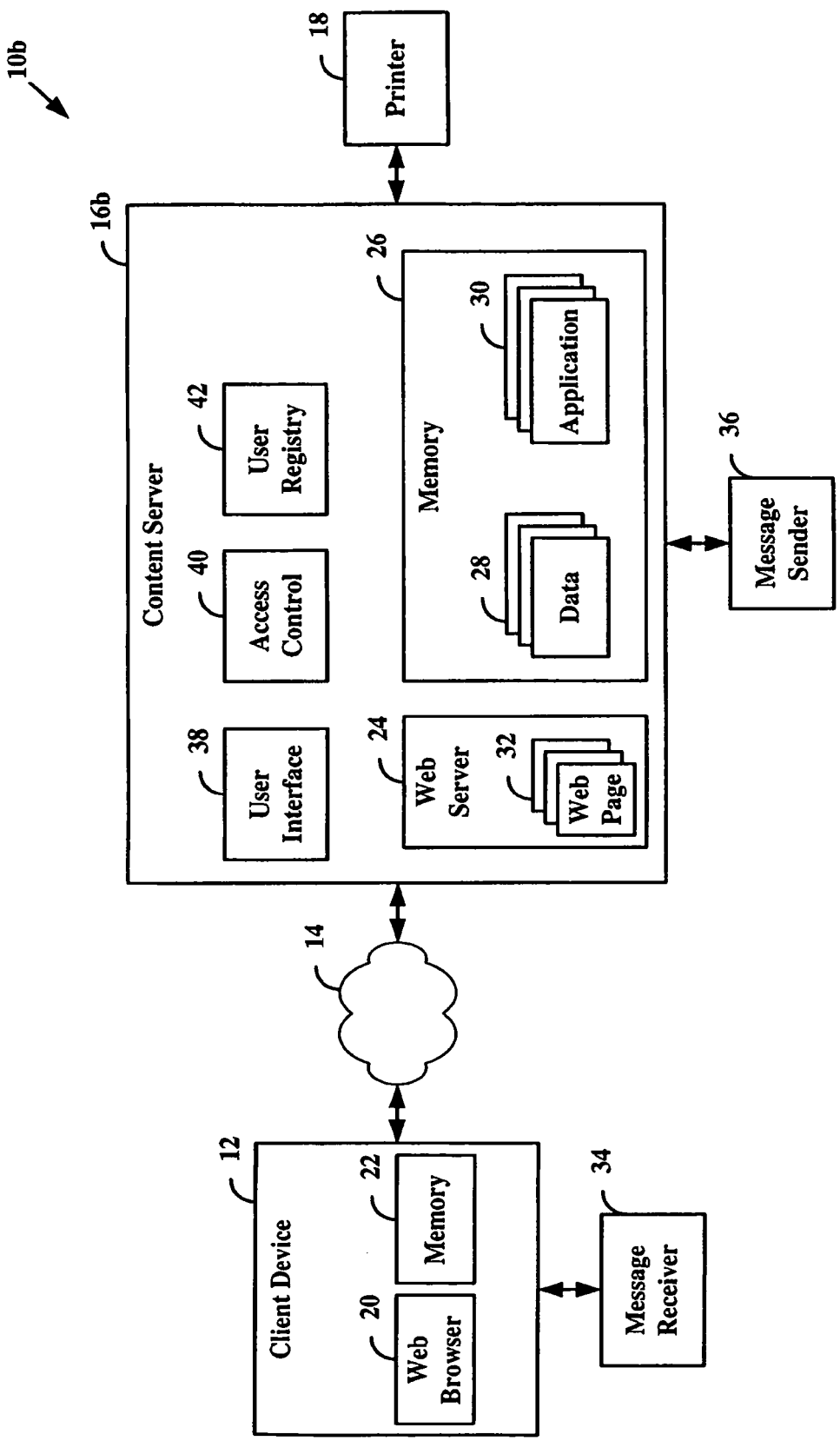
FIG. 3 is a block diagram of an alternative exemplary networked computer system in accordance with this invention.

For convenience, system administration or security purposes, it may be desirable to allow a user to download data files 28 and/or application programs 30 without having to provide the user's address information. Referring now to FIG. 3, an alternative exemplary networked computer system that achieves this goal is described. Networked computer system 10*b* includes content server 16*b*, which includes access control application 40 and user registry 42. To download data files 28 and/or application programs 30 from content server 16*b*, a user of client device 12 provides user identification information to content server 16*a* via user interface 38.

For example, if user interface 38 includes a monitor and keyboard, the monitor may display a prompt requesting a user ID, such as name, account number, social security number, credit card number, or other similar user identification information. In reply, the user may enter a user ID via the keyboard. Alternatively, if user interface 38 includes a magnetic card reader, and the user has a magnetic card that includes user identification information encoded therein, the user may swipe the magnetic car in the magnetic card reader to provide the user identification information.

User interface 38 may then provide the received user ID to access control application 40, which may include hardware and/or software that may be used to retrieve user address information and corresponding address type from user registry 42 based on user identification information. User registry 42 may include a database that associates user identification information with user address information and corresponding address type. An exemplary user registry 42*a* is illustrated in FIG. 4A. In particular, exemplary user registry 42*a* includes a list of user identification information, associated user address information and corresponding address type. For example, user ID "Marsha" is associated with email address "Marshab@xyz.com," user ID "Jan Brady" is associated with voicemail number "415-357-2222," user ID "Cindy" is associated with instant message address "cindy@aol.com," user ID "999-67-2376" is associated with text messaging address "212-674-3891," user ID "4299-5235-6755-0008" is associated with voicemail number "415-357-2222," and user ID "5diGT20N" is associated with email address "greg@comcast.net."

Referring again to FIG. 3, after access control application 40 retrieves the user's address and corresponding address type from user registry 42, content server 16*b* provides a list of data files 28 and/or application programs 30 that may be downloaded. For example, content server 16*b* may display on a monitor a list of icons associated with each of data files 28 and/or application programs 30 that may be downloaded by the user. The user may then select one or more desired data files 28 and/or application programs 30 to download. For example, if user interface 38 includes a mouse, the user may click the icons associated with the desired data files 28 and/or application programs 30.

In response, content server 16*b* causes message sender 38 to send a message that includes the web addresses of the web pages 32 that may be used to access the data files 28 and/or application programs 30 selected by the user. In particular, content server 16*b* causes message sender 38 to send a message of the address type retrieved from user registry 42 to the user address retrieved from the registry. For example, if the retrieved address is an instant messaging address, and the user selected a data file 28 that may be accessed via web page 32*a*, content server 16*a* causes message sender 36 to send an instant message including the web address of web page 32*a* to the user's instant messaging address. Alternatively, if the retrieved address is a text messaging address and the user selected an application program 30*a* that may be accessed via web page 32*b*, content server 16*a* causes message sender 36 to send a text message including the web address of web page 32*b* the user's specified text messaging address.

The user may then retrieve the web address of web pages 32 from message receiver 34. For example, if the retrieved address is an instant messaging address, the user may retrieve the web addresses of web pages 32 from the received instant message. Similarly, if the retrieved address is a text messaging address, the user may retrieve the web addresses of web pages 32 from the received text message. The user may then provide the retrieved web addresses to web browser 20 to view web pages 32, and then download the selected data files 28 and/or application programs 30 from content server 16*b*.

For additional security, networked computer system 10*b* may require that users provide user authentication information, such as a password, personal identification number ("PIN"), fingerprint, voiceprint, retinal scan, or other similar user authentication information, prior to obtaining access to data files 28 and/or application programs 30. For example, user interface 38 may prompt the user to provide both a user ID and password. In reply, the user may enter a user ID and password via a keyboard. User interface 38 may then provide the received user ID and password to access control application 40, which may verify the user's identity by comparing the provided password with password information stored in user registry 42.

For example, as shown in FIG. 4B, alternative exemplary user registry 42*b* includes a list of user IDs and associated stored passwords. Referring again to FIG. 3, if the password information provided by the user via user interface 38 matches the stored password, content server 16*b* may then provide a list of data files 28 and application programs 30 that may be downloaded by the user, and the content selection and message sending processes may proceed as described above. If, however, the password information provided by the user does not match the stored password, access control application 40 may cause user interface 38 to provide an error message to the user, and may allow the user to re-enter the password.

In addition, networked computer system 10*b* may limit user access to one or more of data files 28 and/or application programs 30 based on predefined file access restrictions. For example, as shown in FIG. 4C, alternative exemplary user registry 42*c* includes a list of user IDs and associated file access codes. In the illustrated example, user ID "Marsha"

may access all data files 28 and application programs 30; user ID "Jan Brady" may access all data files 28, but no application programs 30; user ID "Cindy" may not access any data files 28, but may access any Music application programs 30; user ID "999-67-2376" may not access any data files 28 or application programs 30; user ID "4299-5235-6755-0008" may access all data files 28, but no application programs 30; and user ID "5diGT20N" may access any Image data files 28, and any Image application programs 30.

Referring again to FIG. 3, after access control application 40 retrieves the user's ID and file access codes from user registry 42, content server 16b provides a list of any data files 28 and/or application programs 30 that match the user's file access codes. For example, if user "Jan Brady" has provided her user ID to content server 16b, content server 16b may display on a monitor a list of icons associated with any data files 28 in memory 26. Content server 16b will not, however, display icons associated with any application programs 30 in memory 26 because Jan Brady does not have access rights to those files. Similarly, if user "5diGT20N" has provided her user ID to content server 16b, content server 16b may display a list of icons associated with any Image data files 28 and Image application programs 30 in memory 26. Content server 16b will not, however, display icons associated with any other data files 28 or application programs 30 because 5diGT20N does not have access rights to those files.

Persons of ordinary skill in the art will understand that other techniques may be used to control access to data files 28 and application programs 30. For example, access control application 40 may require that the user pay a fee for access to some or all of data files 28 and application programs 30. Thus, if data files 28 include digital music files, access control application 40 may charge a fee per music file or group of music files that may be displayed for download. Similarly, if application programs 30 include game programs, access control application 40 may charge a fee per game application program or group of game application program that may be displayed for download.

Figure 5:
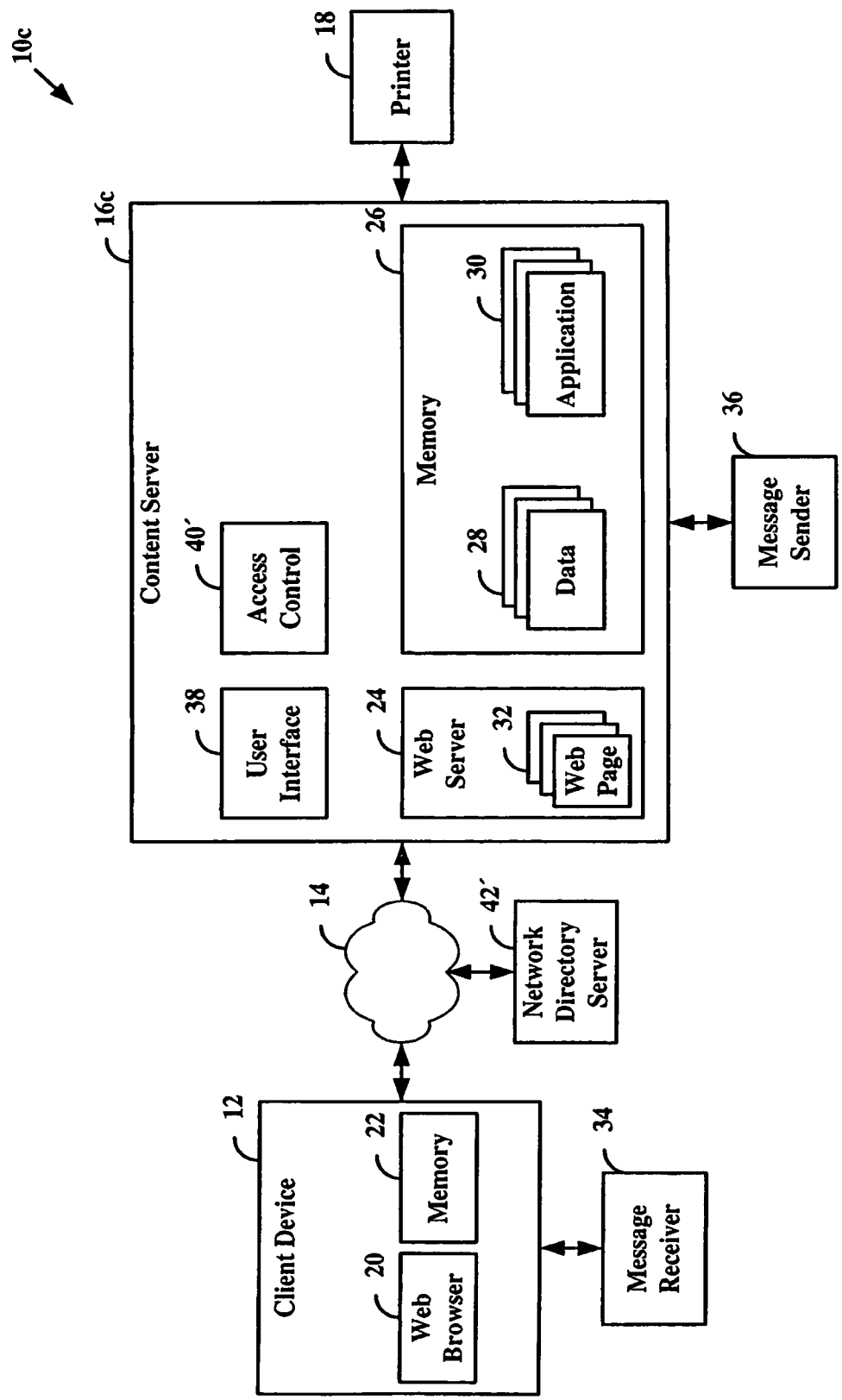
FIG. 5 is a block diagram of another alternative exemplary networked computer system in accordance with this invention.

Referring now to FIG. 5, another alternative exemplary networked computer system in accordance with this invention is described. Networked computer system 10c includes content server 16c, which includes access control application 40' that may communicate with a network directory server 42' via a network 14 using a communications protocol, such as the Lightweight Directory Access Protocol ("LDAP"). Network directory server 42' may be a centralized server that includes a database that associates user identification information with user address information, user account information, file access privileges, and other similar information. Thus, after a user provides a user ID and password to content server 16c via user interface 38, the user interface may then provide the received user ID and password to access control application 40', which may then retrieve address information, file access privileges, and other similar information from network directory server 42'. Based on the retrieved information, content server 16c may provide a list of data files 28 and application programs 30 that may be downloaded by the user, control access to such data files and application programs, and send messages to retrieved addresses as described above.

Referring again to FIG. 2, networked computer system 10a may also include a computer device, such as printer 18, coupled to content server 16a. For example, content server 16a may be a print server adapted to provide print jobs to printer 18. In addition, content server 16a may include a print job management application 30a that may be used to monitor and control print jobs sent to content server 16a for printing on printer 18. To monitor print jobs, however, print job management application 30a may require a network address (e.g., an IP address) of content server 16a and/or printer 18. In accordance with another exemplary embodiment of this invention, content server 16a may cause message sender 36 to send a message to the user's address that includes the web address of the web page associated with print job management application 30a, and any necessary network address information needed to automatically configure the installed application on client device 12. In that regard, the user may install the desired print job management application 30a and begin using the application without needing to first locate network address information for monitored computer devices.

Persons of ordinary skill in the art will understand that various modifications can be made to the invention without departing from the scope of this invention. For example, networked computer systems in accordance with this invention may include a user registry 42 that includes a first set of information (e.g., file access codes) associated with user identification information, and a network directory server 42' that includes a second set of information (e.g., passwords) associated with user identification information. After receiving a user ID and password from user interface 38, access control application 40 may retrieve the password associated with the user ID from network directory server 42' and the file access codes associated with the user ID from user registry 42. If the user-provided password matches the retrieved password, content server 16 then may provide a list of any data files 28 and application programs 30 that match the retrieved file access codes. Various other modifications can be made to the invention without departing from the scope of this invention.

The invention claimed is:

1. A mobile printing system, comprising:
    a mobile client device comprising a message transceiver configured with an SMS messaging address adapted to receive SMS text messages and a web browser;
    said mobile client device configured for communication with a web server, wherein the web server comprises a plurality of web pages identified with web addresses, wherein each web page from among the plurality of web pages is adapted to provide access particular printer drivers;
    said mobile client device configured for communication with a printer server via a wireless telephone network, wherein said printer server comprises a memory including one or more printer drivers, and an end user interface comprising a physical or virtual keyboard integral to said printer server for accepting the SMS messaging address from said end user, forming a user specified SMS messaging address, wherein said keypad is further configured for accepting end user authentication information, thereby eliminating a need for a printer server administrator to decide whether to allow or prevent transmission of said one or more printer drivers to said end user, and wherein said printer server comprises an SMS message sender integral to the printer server wherein the printer server is adapted to cause the SMS message sender to send an SMS message to the end user specified SMS messaging address of the client device through the message transceiver, wherein the SMS message includes the web address of the one or more web pages; and
    said mobile client device configured for, upon receipt of said SMS message, automatically providing the end user with access to one or more printer drivers on said mobile client device without requiring an end user of said mobile client device to previously have access to the network address information of said printer drivers or search for said printer drivers via said web browser.

2. A method of enabling a mobile client device with a printing capabilities, comprising:
coupling a mobile client device with a printer server via a wireless telephone network, said printer server accepting user information from a user via an end user interface of said printer server, said end user interface comprising a physical or virtual keyboard integral to said printer server, said information at least comprising an SMS messaging address associated with the mobile client device, wherein accepting user information further comprises accepting user identification information from an end user, accepting the SMS messaging address from said end user, forming an end user specified SMS messaging address, and accepting user authentication information, thereby eliminating a need for a printer server administrator to decide whether to allow or prevent transmission of said one or more printer drivers to said end user;
said mobile client device providing access to one or more printer drivers located on a web server, wherein said web server comprises a plurality of web pages identified with web addresses, wherein each web page from among the plurality of web pages is adapted to access particular printer drivers;
said mobile client device receiving the web address of the web page in an SMS message to the SMS messaging address from an SMS message sender integral to said printer server;
said mobile client device automatically locating the one or more printer drivers in the memory of said printer server using a web browser associated with the mobile client device and the web address received via the SMS message;
said mobile client device automatically downloading the one or more printer drivers onto the mobile client device using said browser; and
said mobile client device automatically installing the downloaded printer drivers to the client device, thus enabling the mobile client device to print a print job via said printer server.

3. A mobile printing system, comprising:
a mobile client device comprising a message transceiver configured with an SMS messaging address adapted to receive SMS text messages and a web browser;
said mobile client device coupled to a printer server via a wireless telephone network, said printer server comprising a memory including a print job management application for allowing an authorized user to monitor and control print jobs submitted to the printer server via the mobile device, an end user interface comprising a physical or virtual keyboard integral to said printer server for accepting the SMS messaging address from said end user, forming a user specified SMS messaging address, wherein said keyboard is further configured for accepting end user authentication information, thereby eliminating a need for a printer server administrator to decide whether to allow or prevent transmission of said one or more printer drivers to said end user;
said mobile client device configured for communication with a web server containing at least one webpage adapted to provide automatic access to said print job management application upon accessing said at least one webpage; and
said mobile client device coupled to receive an SMS message at the end user specified SMS messaging address of the mobile client device sent through a message transceiver of an SMS message sender integral to the printer server, wherein the SMS message includes an executable link to said web address of said at least one web page, such that, upon execution of said link, automatically providing the end user with said print job management application without requiring an end user of said mobile client device to have access to the network address information of said printer drivers or search for said print job management application via said web browser.

4. A method of enabling a mobile client device with a printing capabilities, comprising:
providing a mobile client device coupled to a printer server via a wireless telephone network;
said mobile client device providing access to a print job management application via a web address via a web server, said print job management application configured for allowing an authorized user to monitor and control print jobs submitted to the printer server via said mobile client device, wherein said printer server uses information from an end user via an end user interface of said printer server, said end user interface comprising a physical or virtual keyboard integral to said printer server, wherein accepting user information further comprises accepting user identification information from an end user, accepting the SMS messaging address from said end user, forming an end user specified SMS messaging address, and accepting user authentication information, thereby eliminating a need for a printer server administrator to decide whether to allow or prevent transmission of said one or more printer drivers to said end user;
the user of said mobile client device receiving an SMS message containing an executable link for accessing said web address;
said mobile client device automatically locating, upon execution of said link, the print job management application using a web browser associated with the mobile client device;
said mobile client device automatically downloading the print job management application onto the mobile client device using said browser; and
said mobile client device automatically installing the downloaded the print job management application to the client device, thus enabling the mobile client device to monitor and control print jobs submitted to the printer server via said mobile device.

5. A mobile printing system, comprising:
a printer server coupled to a mobile client device via a wireless telephone network, said mobile client device comprising a message transceiver configured with an SMS messaging address adapted to receive SMS text messages and a web browser;
said printer server comprising:
a web server;
a memory including one or more printer drivers, wherein the web server comprises a plurality of web pages identified with web addresses, wherein each web page from among the plurality of web pages is adapted to provide access particular printer drivers;
an end user interface comprising a physical or virtual keyboard integral to said printer server for accepting the SMS messaging address from said end user, forming a user specified SMS messaging address, wherein said keypad is further configured for accepting end user authentication information, thereby eliminating a need for a printer server administrator to decide whether to allow or prevent transmission of said one or more printer drivers to said end user; and an SMS message sender integral to the printer server, wherein the printer server is adapted to cause the SMS message sender to send an SMS message to the end user specified SMS messaging address of the client device through the message transceiver, wherein the SMS message includes the web address of the one or more web pages, thus automatically providing the end user with access to one or more printer drivers on said mobile client device without requiring an end user of said mobile client device to previously have access to the network address information of said printer drivers or search for said printer drivers via said web browser.

6. A method of enabling a mobile client device with a printing capabilities, comprising:

providing a printer server in communication with a mobile client device via a wireless telephone network;

said printer server providing access to one or more printer drivers located on a web server, wherein said web server comprises a plurality of web pages identified with web addresses, wherein each web page from among the plurality of web pages is adapted to access particular printer drivers;

said printer server accepting user information from a user via an end user interface of said printer server, said end user interface comprising a physical or virtual keyboard integral to said printer server, said information at least comprising an SMS messaging address associated with a client device, wherein accepting user information further comprises:

accepting user identification information from an end user;

accepting the SMS messaging address from said end user, forming an end user specified SMS messaging address; and accepting user authentication information, thereby eliminating a need for a printer server administrator to decide whether to allow or prevent transmission of said one or more printer drivers to said end user;

sending the user the web address of the web page in an SMS message to the SMS messaging address using an SMS message sender integral to said printer server;

the SMS message sent by said printer server and the web address received via the SMS message allowing a web browser associated with the mobile client device to automatically locate the one or more printer drivers in the memory of said printer server, to automatically download the one or more printer drivers onto the mobile client device using said browser, and to automatically install the downloaded printer drivers to the client device, thus enabling the mobile client device to print a print job via said printer server.

7. A mobile printing system, comprising:

a printer server coupled to a mobile client device via a wireless telephone network, said mobile client device comprising a message transceiver configured with an SMS messaging address adapted to receive SMS text messages and a web browser, said printer server comprising:

a memory including a print job management application for allowing an authorized user to monitor and control print jobs submitted to the printer server via a mobile device;

an end user interface comprising a physical or virtual keyboard integral to said printer server for accepting the SMS messaging address from said end user, forming a user specified SMS messaging address, wherein said keyboard is further configured for accepting end user authentication information, thereby eliminating a need for a printer server administrator to decide whether to allow or prevent transmission of said one or more printer drivers to said end user;

a web server containing at least one webpage adapted to provide automatic access to said print job management application upon accessing said at least one webpage; and an SMS message sender integral to the printer server wherein the printer server is adapted to cause the SMS message sender to send an SMS message to the end user specified SMS messaging address of the client device through the message transceiver, wherein the SMS message includes an executable link to said web address of said at least one web page, such that, upon execution of said link, automatically providing the end user with said print job management application without requiring an end user of said mobile client device to have access to the network address information of said printer drivers or search for said print job management application via said web browser.

8. A method of enabling a mobile client device with a printing capabilities, comprising:

providing a printer server coupled to a mobile client device via a wireless telephone network;

said printer server providing access to a print job management application via a web address via a web server, said print job management application configured for allowing an authorized user to monitor and control print jobs submitted to the printer server via a mobile device;

said printer server accepting user information from an end user via an end user interface of said printer server, said end user interface comprising a physical or virtual keyboard integral to said printer server, wherein accepting user information further comprises:

said printer server accepting user identification information from an end user;

said printer server accepting the SMS messaging address from said end user, forming an end user specified SMS messaging address; and said printer server accepting user authentication information, thereby eliminating a need for a printer server administrator to decide whether to allow or prevent transmission of said one or more printer drivers to said end user;

said printer server sending the user an SMS message containing an executable link for accessing said web address, wherein the SMS message sent by said printer server and the web address received via the SMS message allow a web browser associated with the mobile client device to automatically locate, upon execution of said link, the print job management application using the web browser associated with the mobile client device, automatically download the print job management application onto the mobile client device using said browser, and automatically install the downloaded the print job management application to the client device, thus enabling the mobile client device to monitor and control print jobs submitted to the printer server via said mobile device.

9. A method of enabling a wireless client device with a printing capabilities, comprising:

providing a wireless client device coupled to a printer server via a wireless network;

said wireless client device providing access to a print job management application, said print job management application configured for allowing an authorized user to monitor and control print jobs submitted to the printer server via said wireless client device, wherein said printer server uses information from an end user entered via an end user interface of said printer server, wherein accepting user information further comprises accepting user identification information from an end user, accepting a messaging address from said end user, forming an end user specified messaging address, and accepting user authentication information, thereby eliminating a need for a printer server administrator to decide whether to allow or prevent transmission of said one or more printer drivers to said end user;

said mobile client device receiving a message containing an executable link for accessing said print job management application;

said mobile client device automatically locating, upon execution of said link, the print job management application;

said mobile client device automatically downloading the print job management application onto the mobile client device; and said mobile client device automatically installing the downloaded the print job management application to the client device, thus enabling the mobile client device to monitor and control print jobs submitted to the printer server via said mobile device.

10. A method of enabling a mobile client device with a printing capabilities, comprising:

providing a printer server coupled to a mobile client device via a wireless telephone network;

said printer server providing access to a print job management application, said print job management application configured for allowing an authorized user to monitor and control print jobs submitted to the printer server via a mobile device;

said printer server accepting user information from an end user via an end user interface of said printer server, wherein accepting user information further comprises:

said printer server accepting user identification information from an end user;

said printer server accepting a messaging address from said end user, forming an end user specified messaging address; and said printer server accepting user authentication information, thereby eliminating a need for a printer server administrator to decide whether to allow or prevent transmission of said one or more printer drivers to said end user;

said printer server sending the user a message containing an executable link for accessing said print job management application, wherein the message sent by said printer server and the link received via the message allow the mobile client device to automatically locate, upon execution of said link, the print job management application, automatically download the print job management application onto the mobile client device, and automatically install the downloaded the print job management application to the client device, thus enabling the mobile client device to monitor and control print jobs submitted to the printer server via said mobile device.

* * * * *